(12) United States Patent
Unice

(10) Patent No.: US 9,445,137 B2
(45) Date of Patent: Sep. 13, 2016

(54) METHOD FOR CONDITIONING A NETWORK BASED VIDEO STREAM AND SYSTEM FOR TRANSMITTING SAME

(75) Inventor: W. Kyle Unice, Sandy, UT (US)

(73) Assignee: L-3 COMMUNICATIONS CORP., New York, NY (US)

( * ) Notice: Subject to any disclaimer, the term of this patent is extended or adjusted under 35 U.S.C. 154(b) by 551 days.

(21) Appl. No.: 13/363,366

(22) Filed: Jan. 31, 2012

(65) Prior Publication Data

US 2013/0194436 A1    Aug. 1, 2013

(51) Int. Cl.
| | | |
|---|---|---|
| H04N 5/225 | (2006.01) | |
| H04N 7/26 | (2006.01) | |
| H04N 21/238 | (2011.01) | |
| H04N 21/234 | (2011.01) | |
| H04L 29/06 | (2006.01) | |
| H04N 19/61 | (2014.01) | |
| H04N 19/895 | (2014.01) | |

(52) U.S. Cl.
CPC .......... H04N 21/238 (2013.01); H04L 65/604 (2013.01); H04L 65/80 (2013.01); H04N 19/61 (2014.11); H04N 19/895 (2014.11); H04N 21/23418 (2013.01)

(58) Field of Classification Search
CPC .......... H04N 1/32149; H04N 21/485; H04N 2201/3205; H04N 2201/3207; H04N 2201/3226; H04N 2201/3233; H04N 2201/327; H04N 2201/3271; H04N 5/23248; H04N 19/00018; H04N 19/00096; H04N 19/00121; H04N 19/00127; H04N 19/0014
See application file for complete search history.

(56) References Cited

U.S. PATENT DOCUMENTS

| | | | |
|---|---|---|---|
| 6,985,174 B1* | 1/2006 | Thompson et al. .......... 348/180 |
| 2005/0089102 A1* | 4/2005 | Alvarez Arevalo et al. ........................ 375/240.27 |
| 2005/0229071 A1* | 10/2005 | Uga .............................. 714/748 |
| 2008/0133766 A1* | 6/2008 | Luo .............................. 709/231 |
| 2009/0102926 A1* | 4/2009 | Bhogal et al. ................ 348/181 |

* cited by examiner

Primary Examiner — Twyler Haskins
Assistant Examiner — Carramah J Quiett
(74) Attorney, Agent, or Firm — Husch Blackwell LLP

(57) ABSTRACT

A method for conditioning a network based encoded video stream including receiving the video stream over an RF data link, detecting any missing and/or corrupted data within the data stream, and inserting curative data in place of the missing or corrupted data. A system and method for transmitting a real-time video stream to an end-user at least partially over an RF data link including the video conditioner wherein a camera obtains video footage, an encoder to compresses the video stream, an RF transmitter transmits the encoded video stream over an RF data link, and an RF receiver to receives the encoded video stream from the RF transmitter. The video stream is conditioned by the video conditioner and routed to an end user through a computer network wherein a decoder decodes the encoded video stream and the video stream is viewed on a display.

21 Claims, 3 Drawing Sheets

METHOD FOR CONDITIONING A NETWORK BASED VIDEO STREAM AND SYSTEM FOR TRANSMITTING SAME

CROSS-REFERENCE TO RELATED APPLICATIONS

None.

BACKGROUND OF THE INVENTION

The continued evolution of the dissemination of information through computer networks has constantly challenged the current state of technology, particularly, as it related to real-time video streaming. Video capture and transmission has been constantly evolving since the earliest silent films and audio-visual films that used a projector to illuminate the contents of each frame of the film onto a screen. Video transmission leaped forward upon the development of transmitting audio and visual information over radio frequency (RF) waves into homes wherein video and audio was viewed in a living room on the television.

Audio and visual data transmission technology advanced further with the development of networks providing cable television services wherein the audio and visual data for many channels was transmitted simultaneously through a wired connection. Another leap in video data distribution technology occurred in the past fifteen years with the expanded scope of the internet and the transmission of data over wired networks updated and expanded to provide access to the internet. The evolution of the internet and the refinement of video capture devices have resulted in an enormous amount of audio/video being captured and posted on individual websites or through sharing sites like You-Tube®. The internet has also had an enormous affect upon news and information gathering and subsequent transmission, thereby providing the world with virtually instantaneous dissemination of information. In recent local, national, and world events, video uploads and posting of videos onto social media or other sharing sites immediately after the video has been captured or emailing the just captured video files to news organizations has continued to feed the expectations of the news consuming public for instantaneous news.

One recent development combining advances in hardware technology and computer networking is instantaneous news or media transmitted and viewed in substantially real-time video data streams. Real-time video data streams can now transmit a live event through the wired connections of a computer network such as the internet to allow a person in New York City may be able to view a concert or sporting event in London or Paris on their computer in their living room in virtually real time. The broadcast of an audio-visual event that can be viewed on known media players installed on a personal computer, laptop, smart phone, or tablet, such as Windows® Media Player, QuickTime®, and Video-LAN™ has become common place and demanded by today's media consuming public.

When real-time video data streams are captured on a stationary camera, encoded on an encoder that is wired directly into the computer network and transmitted through the same wired computer network, very limited signal interruption and/or data loss occurs during the transmission of the encoded video data stream. As such, the video data stream is decoded easily on conventional decoding applications and viewed substantially in real-time by the end user. Real-time video data streaming is becoming more and more common, and commercially available software applications now permit anyone having access to a PC or laptop that is connected to the internet and equipped with a web cam to video stream.

More recently, the transmission of real-time encoded video data streams through a computer network has been expanded to transmitting the data stream, at least in part, through a radio frequency (RF) data link from moving vehicles, very remote locations, or any other location or conditions wherein the video feed cannot be continuously wired into the transmitting computer network. The insertion of an RF data link into the physical layer of the computer network and the increased instance of data loss and corruption associated therewith has exposed a shortcoming in commonly implemented video data streaming decoding software that must be overcome in order to provide the end users a desirable end product that does not fail when losses in the data stream are introduced by the RF link.

Current video data streaming systems incorporate an asymmetric compression methodology wherein the encoders are more complex than the decoders. The encoder is usually algorithmic and adaptive whereas the decoder is less sophisticated and, in a sense "dumb," in that the decoder merely carries out fixed actions on the receiving end of the transmission. This methodology prevails in the marketplace because it is the most resource efficient. The higher cost item (a more complicated encoder) is located at the source of the data subject to transmission and the lower cost item (a compatible decoder) can be cheaply distributed to all of the end users. A majority of the commercially distributed decoder applications currently installed and used by end users simply are not developed to recover from data stream corruptions due to the desire to keep the costs of the application down. As a result, the decoders often crash, freeze, or shutdown when trying to decode an interrupted or corrupted data stream that commonly results from transmission over an RF data link.

Today's demanding consumers do not continue to subscribe and pay to view streaming video that continually, routinely and unpredictably causes their computers to freeze or crash. Thus, there is a substantial need in the art to condition an encoded real-time video data stream including missing or corrupt data, data sequences, or operations due to being transmitted, at least in part, over an RF data link to compensate for the associated data loss or corruption so that the existing software or hardware decoders receive a continuous, uninterrupted video data stream having a conditioned data sequence sufficient to avoid a stall, crash or other inconvenient freeze or interruption of an end user's computer during decoding to allow for uninterrupted viewing of the video data stream.

SUMMARY OF THE INVENTION

The prevalence of the assymetric compression method system in the marketplace requires for the first time a development of a system and method to restore the encoded video data stream when interruptions and data loss or corruption are introduced into a data stream by the physical layer of the network. A system and method of restoring the interrupted data stream is particularly needed for interruptions introduced after encoding has been performed in order for the video data stream to be continuously decoded and viewed by end users without freezing or crashing the end user's computer. The present invention is directed toward a method for conditioning an encoded real-time video data stream wherein the transmission of the encoded signal is vulnerable to or actually experiences interruption and data loss. The present invention is also directed toward a system for transmitting a real-time video data stream, at least in part, over an RF data link including video conditioning.

The present invention is most applicable for network based encoded RF video feeds that obtain video footage remotely and transfer the compressed video files over varying distances using an RF data link. However, the system of the present invention may be implemented in any video transmission network wherein the physical layer introduces signal interruption and data loss or corruption into the video data stream. Embodiments of the present invention include the RF transmission of a real-time video data stream captured by a camera wherein the encoded real-time video data stream is transmitted, at least partially, through an RF data link and a video conditioner that is inserted at the receiver end of the RF data link to (1) detect missing or corrupt data in the real-time data stream and (2) condition the video data stream in real-time by inserting curative space data into the data stream that compensates for in any missing or corrupt data. Accordingly, the video conditioner outputs an uninterrupted, continuous, substantially real-time video data stream that can be continuously displayed by currently installed decoder hardware or software applications.

One embodiment of the method of conditioning an interrupted real-time video data stream transmitted, at least in part by an RF data link includes: receiving an encoded video data stream, determining if the decoding sequence of the encoded video data stream has been interrupted by data loss, inserting a known intermediate decoding sequence matching the last known decoding state in place of missing or corrupt data in the encoded video data stream, forwarding a continuous and uninterrupted encoded video data stream to end users, and decoding the encoded video data stream to be played on the display of one or more consumer.

One embodiment of the system of the present invention includes a vehicle, a video camera, an encoder, an RF transmitter, an RF transmitted signal, an RF receiver, the video conditioner, a computer network, a decoder and a display. The vehicle is generally capable of moving at high speeds and over great distances, or is capable of travelling to locations wherein conventional wired transmission is not possible. The vehicle may be a car, truck, train, helicopter, airplane, space shuttle, rocket, missile, drone aircraft, satellite, or any other apparatus capable of receiving or sending long distance RF video transmissions.

Other aspects and advantages of the present invention will be apparent from the following detailed description of the preferred embodiments and the accompanying drawing figures.

BRIEF DESCRIPTION OF THE SEVERAL VIEWS OF THE DRAWING

The accompanying drawings form a part of the specification and are to be read in conjunction therewith, in which like reference numerals are employed to indicate like or similar parts in the various views, and wherein.

DETAILED DESCRIPTION OF THE INVENTION

Figure 1:
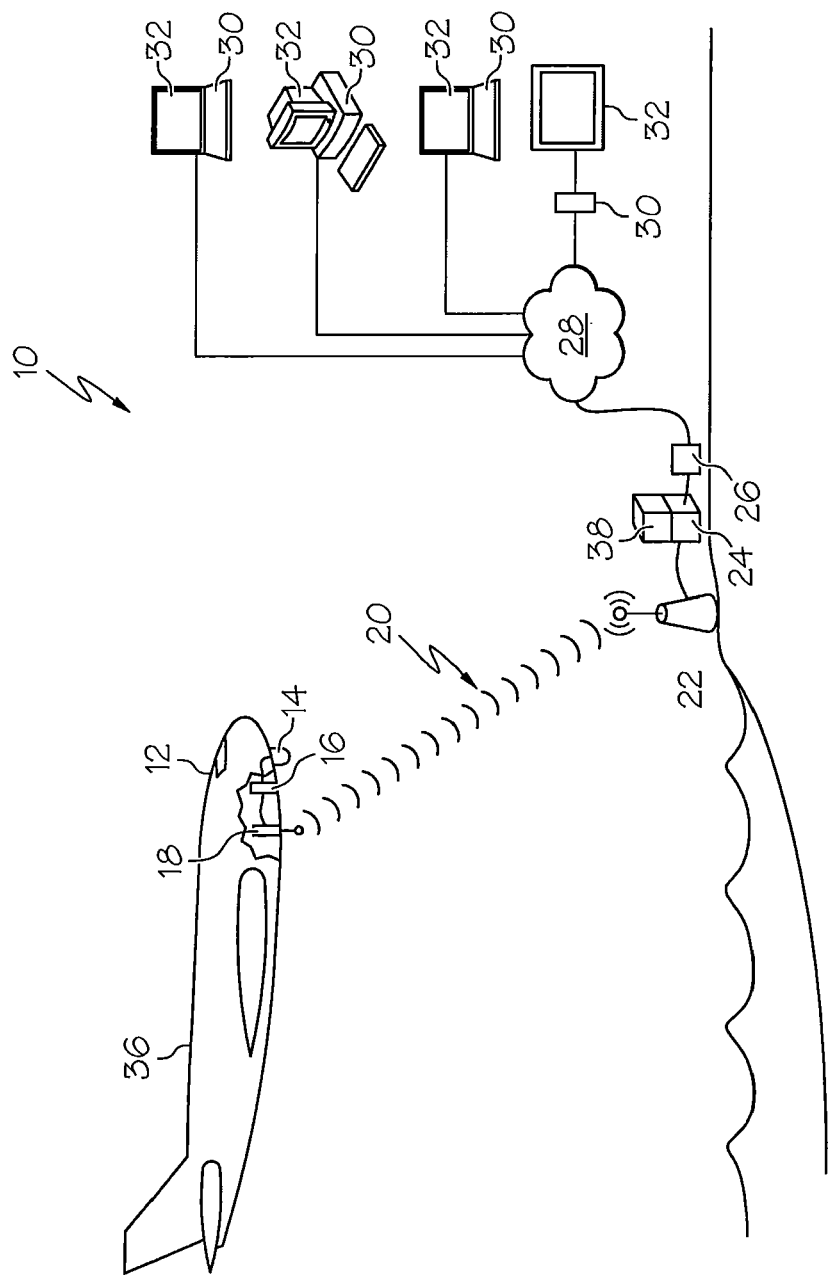
FIG. 1 is a schematic drawing of one embodiment of the system for transmitting a network based encoded video data stream in accordance with the teachings of the present invention and having a personal electronic device mounted therein.

The following detailed description of the invention references the accompanying drawing figures that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and, therefore, the description is not to be taken in a limiting sense and shall not limit the scope of equivalents to which such claims are entitled.

The present invention is directed toward a system for conditioning network based encoded video and the transmission thereof over an RF data link. The system for transmitting a video data stream over an RF data link 10 of the present invention includes a vehicle 12, a video camera 14, an encoder 16, an RF transmitter 18, an RF transmitted signal 20, an RF receiver 22, a video conditioner 24, a router 26, a computer network 28, one or more decoder 30 and one or more display 32. Vehicle 12 is generally capable of moving at high speeds and over great distances, or is capable of travelling to locations wherein conventional wired transmission is not possible. Vehicle 12 may be a car, truck, train, helicopter, airplane, space shuttle, rocket, missile, drone aircraft, satellite, or any other apparatus capable of receiving or sending RF video transmissions. Vehicle 12 is necessarily configured to include a sufficient power source and any equipment necessary to facilitate and support the RF transmission of a data stream.

Video camera 14 may be any video camera now known or hereafter developed used to obtain video footage for computer network transmission. Video camera 14 may also include capture of audio synced with the video. Video camera 14 may be a professional grade camera or a personal video camera wherein the camera is configured to be used within a computer network. The capturing of video and audio footage is well known in the art and, as such, a person of skill in the art will appreciate that the type of video camera used is not critical to the present invention and the above description is not to be considered as limiting.

Encoder 16 may be any hardware or software based encoder now known or hereafter developed to encode video data obtained by camera 14 into a compressed digital format to be conveyed through a wireless or wired digital computer network. Encoder 16 is in electronic communication with camera 14. Encoder 16 may be integrated into camera 14 or may be in a separate body or computer. Encoder 16 may employ a lossy or lossless data compression system. However, lossy compression is currently preferred in the video industry as it provides a greater compression ratio than lossless compression thereby requiring less memory and resources to transmit or store the compressed video data stream. One embodiment of encoder 18 employs the MPEG-2 format standard including a combination of the lossy video compression and lossy audio data compression methods to compress an analog video/audio stream. However, any compression standard now known or hereafter developed is within the scope of the present invention including, but not limited to MPEG-1, MPEG-2, MPEG-3, MPEG-4, AVC, HVEC, MOV, WMV, H.264, QuickTime H.264, DivX, or any other compressed video format. The system of the present invention is agnostic to the compression method applied to the video data stream and, therefore, can be used with substantially any video compression format.

RF transmitter 18 may be any wireless RF signal transmitter now known or hereafter developed used to transmit data files from one-point to another wherein the points are not physically connected by a wire. RF transmitter 18 is in electronic communication with encoder 16. Embodiments of RF transmitter 18 may generate RF signal 20 transmitting encoded data through radio waves from vehicle 12 to one or more receivers 22 over a distance through a secure or unsecure computer network. One embodiment of the present invention includes the encoded video signal being transmitted by RF transmitter 18 on vehicle 12 to receiver 22 in Internet Protocol (IP) data packets. Such RF systems are known in the art and are capable of transmitting IP data packets in RF transmitted signal 20. RF transmitted signal 20 may have a frequency in the range from 1 kiloHertz (kHz) to 300 GigaHertz (GHz). One embodiment of the present invention includes the encoded video data stream being transmitted over an RF data link such as the data links offered and provided by L-3 Communications as of the date of the present invention and the RF transmitters 18 used therein.

RF receiver 22 may be any wireless signal receiver now known or hereafter developed that receives data files at one-point transmitted from another wherein the points are not physically connected by a wire. Embodiments of RF receiver 22 may receive RF signal 20 that includes the encoded video data stream in radio waves to complete the wireless conveyance of data from vehicle 12 to receiver 22 over a great distance that is further transmitted through computer network 28. RF receiver 22 is in radio communication with RF transmitter 18. RF receivers 22 are currently known in the art and are configured receive RF transmitted signals 20 from RF transmitter 18 wherein RF signal 20 may range in frequency from 1 kiloHertz (kHz) to 300 GigaHertz (GHz). One embodiment of the present invention includes the encoded video data stream being transmitted over an RF data link such as the data links offered and provided by L-3 Communications as of the date of the present invention and the RF receivers 22 used therein. Another embodiment includes a plurality of receivers 22 configured to receive the signal 20 from RF transmitter 18.

Video conditioner 24 inserts itself in the data stream directly after RF receiver 22 and, in real-time or substantially in real-time, validates each data sequence or operation before router 26 directs the encoded video data stream into wired computer network 28. Video conditioner 24 detects missing or corrupt data and replaces the missing or corrupt data with encoded curative data that include encoded data sequences or operations that replace the missing or corrupt data and provide the necessary data to transition to and from the interrupted video data stream. The data sequences are any related data bits in sequence and data sequences also encompass operations that comprise at least one instruction and the associated data thereof. The current data sequence and operation in the video data stream are read by the decoder and used to update the video frames resulting the viewing of the video stream on display 32.

Figure 2:
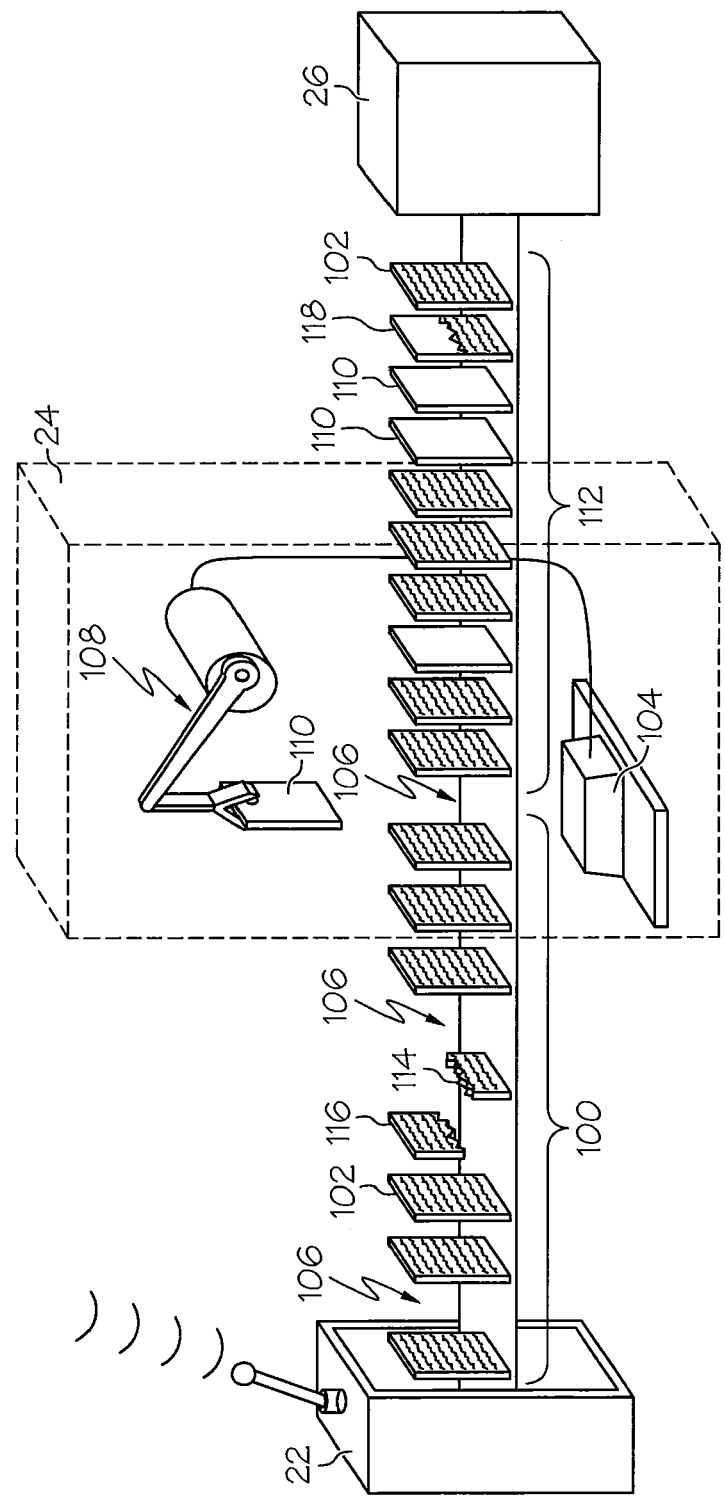
FIG. 2 is a schematic drawing of one embodiment of a system for conditioning a network based encoded video data stream in accordance with the teachings of the present invention.

As shown schematically in FIG. 2, one embodiment of video conditioner 24 is in electronic communication with RF receiver 22 and receives an incoming video data stream 100 from receiver 22 that includes received data sequences or operations 102. Detector 104 acts as a decoder to detect the location and properties of missing data sequences or operations 106, signals to conditioning routine 108 to insert a curative space data sequence or operation 110 into the data stream in its place. An embodiment of the present invention may further include detector 104 of video conditioner 24 detecting missing data sequences and/or incomplete packet or operations having a readable instruction wherein all or some of the data associated with the instruction is missing, corrupt, incomplete or compromised. These instruction containing incomplete operations 114 are shown schematically on FIG. 2. Corrupt, incomplete or compromised data is often referred to collectively herein as "corrupt data." Another scenario includes detector 104 reading data associated with a missing or corrupt instruction such that decoder 30 doesn't know what to do with the readable data that, because the instruction is missing, is unassociated to an instruction. This unassociated data 116 is shown schematically in FIG. 2.

In the case of incomplete operation 114, detector 104 may notify conditioning routine 108 that the video data stream includes incomplete operation 114 and conditioning routine 108 inserts the necessary data to complete an instruction of incomplete operation 114 to result in a readable complete data sequence or operation 118 as shown. In the event detector 104 detects unassociated data 116, conditioning routine 108 may remove the unassociated data sequence 116 from the video data stream and insert a complete curative data sequence or operation 110 in its place.

The outgoing data sequences or operations 102 and 110 together comprise an outgoing conditioned continuous, uninterrupted video data stream 112 that is directed out into the network 28 by router 26. Curative space data or operation 110 matches the encoded video timestamps and sequence to maintain the integrity of the video data stream. Curative data or operation 110 may include simply providing the necessary associated data to complete an instruction of an operation that is able to be read by the decoder but where one or more piece of associated data is missing. One embodiment of the present invention includes curative space data or operation 110 having an encoded decoding sequence that is results in an entire replacement screen or portion thereof when the entire data stream is interrupted for extended frames or for multiple operations. Embodiments of the curative space data or operation 110 may include a replacement screen or portion thereof that includes an area of or the entire screen or frame displayed being a blank white or black area. However, any color of blank screen may be utilized and the color may be selected based upon the color of the surrounding area in the video stream in order to blend better into the readable video stream. Curative data sequence or operation 110 inserted by video conditioner 24 may also include a message to the viewer indicating that there is an interruption in the service for a predetermined period of time. Such a message may indicate "LINK OUTAGE," "SIGNAL INTERRUPTION," or any other indicator to the viewer that there is an interruption in the data signal and/or video data stream.

An embodiment of the present invention may include at least one or more of the following pre-coded curative data 110. The standard curative data 110 may be a replacement screen data packet that comprises the encoded data sequence and operation necessary to result in the display of a blank screen when the sequence is decoded. Another embodiment includes the replacement screen being a portion of or a smaller block of the screen when only a portion of the data of a given video stream is corrupted or missing. Video conditioner 24 may also insert a transitioning curative data into the video data stream when it first detects a link outage or signal interruption. The transitioning curative data includes an encoded sequence or operation that provides the decoder instructions and data necessary in order to transition between the last known decoded state of the video data stream and the replacement screen data. Video conditioner 24 may also insert a resuming curative data in the place of the next good received video data in the restored video data stream. The resuming curative data incorporates the known decoded state of the next good received data sequence or operation and provides the decoder the necessary decoding sequence or operation to transition between the curative data sequence or operation and the data of the resumed real-time video data stream.

If video conditioner 24 detects an interrupted video data stream lasting a pre-determined length, the video conditioner 24 may insert a curative data sequence or operation resulting in all or a portion of the displayed screen being blank. In addition, one embodiment further includes a message instruction inserted into the curative sequence or operation to notify the viewer that the signal from the RF transmission is interrupted. While the inserted curative data may result in all or a portion of a screen having white or black space displayed, the inserted curative data provides a continuous uninterrupted real-time video data stream that allows the viewer to view the video data stream without crashing the decoder software application or inducing hardware failure.

Router 26 may be any computer network router now known or hereafter developed that forwards and directs data packets between and/or within computer networks, or any network appliance that enables video conditioner 24 to connect to network 28 that will relay the conditioned video stream 112 to one or more decoder 30. As shown in FIG. 1, router 26 is in electronic communication with video conditioner 24 and routes uninterrupted video data stream 112 to the computer network 28 and to the end-user's computer wherein decoder 30 decodes the encoded data stream to allow viewing by the end user on display 32. Thus, RF transmitted video data stream passing through video conditioner 24 ensures that substantially any standard video decoder 30 (software or hardware based) maintains state and does not fail or stop decoding during the video data stream.

Computer network 28 may be any computer network now known or hereafter developed or configured wherein an encoded data stream is capable of being communicated from one computer to another. Computer network 28 is usually the established Internet used by most people around the world. Computer network 28 is in electronic communication with router 26. Computer network 28 may be a closed or open computer network wherein access to the encoded video data stream can be controlled or not. Computer network 28 may include one or more of the following network types: local area network (LAN), campus area network (CAN), backbone network, metropolitan area network (MAN), wide area network (WAN), enterprise network, a virtual private network, the internet, or any other network type or application now known or hereafter developed. A person of skill in the art will undoubtedly appreciate that data continuous uninterrupted video data stream 112 may be transferred through many configurations of computer network 28 that are well within his or her scope of knowledge and experience that may be set up as a result of nothing more than routine experimentation.

One embodiment includes computer network 28 including an "1:N" routing configuration in which uninterrupted video data stream 112 is transmitted from a single source to "N" number of users through router 26 wherein N is greater than one. One embodiment includes each decoder 30 being stored on each end user's computer wherein the end user's computer is in direct communication with router 26 through computer network 28 a multi-cast configuration according to techniques and configurations now known or hereafter developed. Another embodiment includes a 1:1 routing wherein the uninterrupted video data stream 112 is only transmitted directly to one end user. Still another embodiment includes uninterrupted video data stream 112 being hosted on a server wherein one or more users may access and view uninterrupted video data stream through the internet via a hosted website or web application.

Decoder 30 may be any hardware or software based decoder configured to decode a digital data stream into an analog signal that can be displayed on display 32. Decoder 30 is in electronic communication with computer network 28. Decoder 30 is compatible with encoder 16 wherein decoder 30 is configured to decode the encoding compression method performed by encoder 16. Hardware decoder devices are well known to persons of skill in the art. Decoder 30 may also be a software based decoder contained in a widely available software application such as: Windows® Media Player, QuickTime®, and VideoLAN™, or any other software based media player. Decoder 30 decodes the series of data sequences or operations in the video data stream to display the video image and update the image displayed based upon the then-current encoded data sequence or operation to provide the continuous real-time video display.

Display 32 may be any standard or high-definition monitor or television now known or hereafter developed configured for a user may view video thereon. Display 32 is in electronic communication with decoder 30. An embodiment of display 32 may also incorporate one or more speakers so as to allow a user to hear any audio included in the video data stream. Display 32 may be incorporated into a monitor for a desktop computer, a lap-top, a tablet PC, an iPad®, a smartphone, or any other fixed or portable electronic device. Display 32 may be a high definition or standard definition television. One embodiment includes decoder 30 being incorporated directly into the circuitry of display 32 such that uninterrupted video signal 112 is transmitted directly into display 32 through a wired or wireless connection.

In use, the system of the present invention provides for an uninterrupted computer network based encoded video data stream transmitted, at least in part, over one or more an RF data links and thereby experiencing data loss and corruption associated therewith. As shown in FIG. 1, one embodiment of the system of the present invention includes vehicle 12 having camera 14 mounted thereon or in wired communication therewith. As such, an alternative embodiment includes camera 14 being operated by a camera person instead of being mounted directly to vehicle 12. Vehicle 12 in FIG. 1 is shown as an airplane 36. Due to an airplane's inherent operation, it is unrealistic and unknown for camera 14 on airplane 36 to be in wired connectivity with computer network 28. Further, airplane's 36 constant changes in position, its high velocity, and its substantial distance from receiver 22 requires an RF data link to transfer the encoded data from airplane 36 to receiver 22.

As further shown in FIG. 1, camera 14 obtains video data and the video data stream is sent electronically to encoder 16 wherein encoder 16 performs a lossless or lossy compression method on the video data stream. The video data stream is electronically communicated to RF transmitter 18 wherein RF transmitter 18 transmits the lossless or lossy compressed video data stream to RF receiver 22 on the ground over an RF data link. In another embodiment, a land-to-land RF transmission may also be made if the camera 14 is mounted on or operated remotely and transmission is made from vehicle 12 suited for terrestrial operation.

The encoded video signal 20 is transmitted by RF transmitter 18 on airplane 36 to receiver 22 in Internet Protocol (IP) data packets. Because of the nature of RF data link communication, the potential for random interference, and the distances covered by the RF data link, receiver 22 often does not receive all or some of the data in the data sequences or operations in an IP data packet. As such, portions of the real-time video data stream are often interrupted and/or corrupted and the continuous video data stream is not viewable on most all decoders 32 in its received state due to the inability of the decoder to compensate for interruptions or corruption in the video data stream. Accordingly, receiver 22 forwards the encoded video data stream to video conditioner 24 which, in the embodiment shown, comprises video conditioning computer 38.

Figure 3:
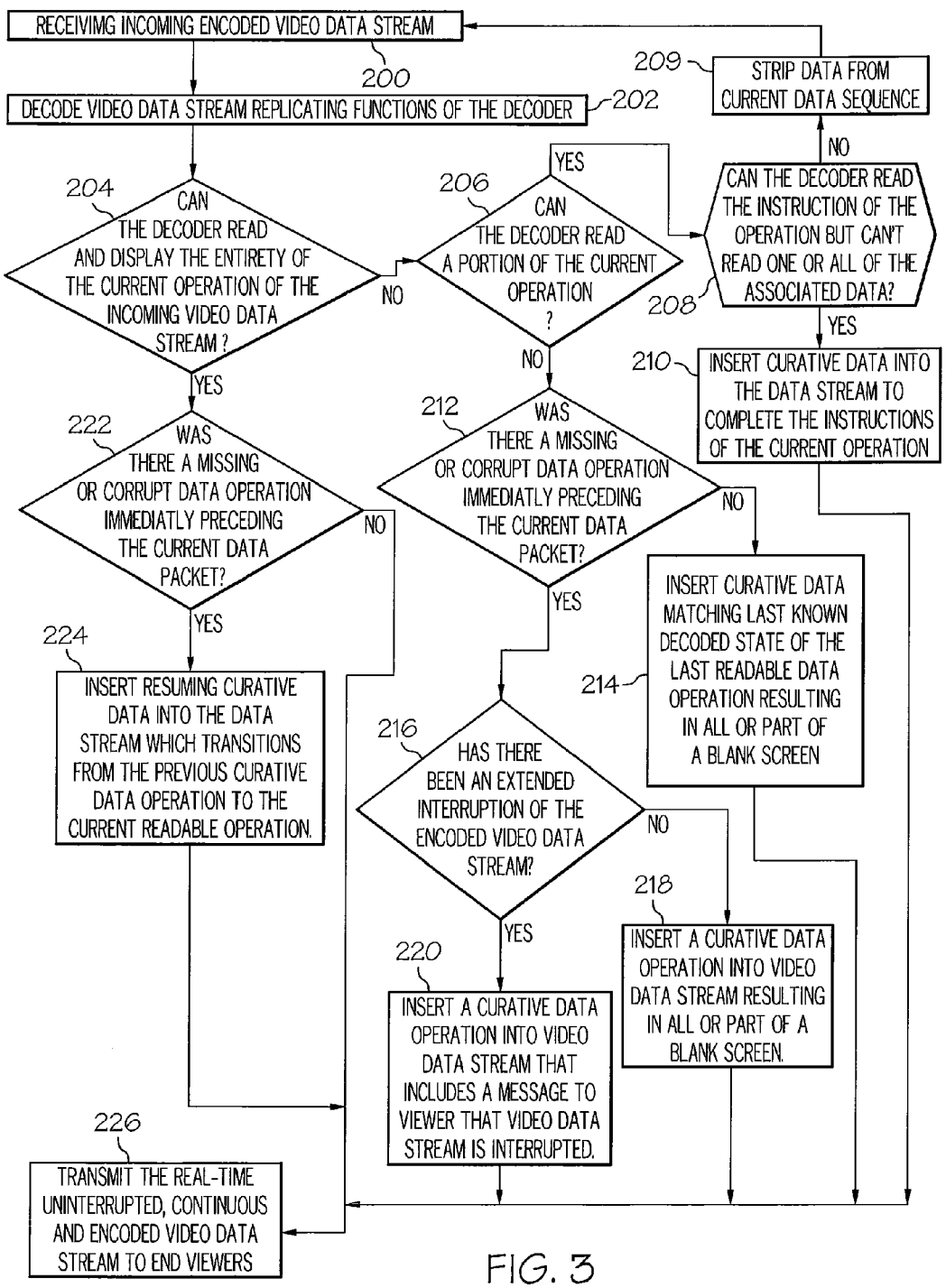
FIG. 3 is a schematic drawing of one embodiment of the method for conditioning a network based encoded video data stream in accordance with the teachings of the present invention.

In one embodiment, video conditioner 24 contained within video conditioner computer 38 performs the conditioning method as set forth in FIG. 3. In step 200, video conditioner 24 receives the incoming encoded data stream 100. In step 202, video conditioner 24 replicates the process of the decoder in order to determine, as set forth in step 204, whether a decoder will be able to read and display the entirety of the current data sequence or operation of the incoming video data stream 100. The decoder may not be able to read and display the video as provided by the current data sequence or operation due to data loss corruption caused by a multitude of possible reasons, for example if interference blocks the transmission of a portion of or the entire data sequence or operation in the video data stream. If video conditioner 24 determines that the decoder cannot read and display the current data sequence or operation because there has been an interruption in the video data stream, video conditioner 24 performs step 206 and determines whether or not the decoder can read a portion of the current data sequence or operation.

If the decoder can read a portion of the current data sequence or operation, video conditioner 24 determines in step 208 if it can read the instruction of the operation and, therefore, some of the data associated with the instruction must be missing to cause the error in the decoder. If video conditioner 24 concludes that there is no instruction that is part of this data sequence, then video conditioner performs step 209 and strips the remaining data in that sequence and returns to step 200. If video conditioner 24 does read an instruction, but cannot complete it because there is missing associated data, then in step 210, video conditioner 24 inserts curative data into the data stream to complete the instructions of the current operation.

If step 206 determines that there is an entire data sequence or operation missing from the video data stream, then video conditioner 24 performs step 212 wherein it determines whether there was a missing or corrupt data sequence or operation in the video data stream immediately prior to the current data sequence or operation. If there was not a corrupt or missing data sequence or operation immediately preceding the current data sequence or operation in the video data stream, then as illustrated in step 214, video conditioner 24 inserts transitioning curative data wherein the contents of one embodiment of the transitioning curative data was previously described.

If video conditioner 24 determines in step 212 that there was a corrupt or missing data sequence or operation immediately preceding the current data sequence or operation in the video data stream, then it moves to step 216 wherein it determines whether there has been an extended interruption of the encoded video data stream. If there has not been an extended interruption, then in step 218, video conditioner 24 inserts curative data sequence or operation 110 into the encoded video data stream. The curative data sequence matches the time stamp and frame sequencing of the video stream to ensure that the video data stream is continuous. If there has been an extended interruption, then in step 220, video conditioner 24 may insert a curative data sequence or operation 110 into the encoded video data stream wherein the curative data sequence or operation 110 instructs the decoder to display a message to the viewer that the video data stream is interrupted. The duration of time that the video data stream has been interrupted before the message is displayed can be set at any value. Alternatively, no message may be displayed and the viewer will continue to view a blank or a portion of the screen being blank until the video data stream is restored.

If, in step 204, video conditioner 24 determines whether the decoder will be able to read and display the current data of the incoming video data stream 100, then in step 222, video conditioner 24 determines whether there was a missing or corrupt data sequence or operation immediately preceding the current data sequence or operation. If the immediately preceding data sequence or operation was missing or corrupt, then video conditioner 24 performs step 224 and inserts resuming curative data sequence or operations as previously described into the encoded video data stream. Step 226 is the final step of this embodiment of video conditioner 24 wherein the conditioned video data stream is transmitted to computer network 28 through router 26. Step 226 occurs after (1) the system determines the decoder can read and display the current data sequence or operation and there is no missing or corrupt data immediately before the current data sequence, (2) the completion of step 210, (3) the completion of step 214, (4) the completion of step 218, (5) the completion of step 220, or (6) the completion of step 224. The transmitted video data stream transmitted in step 226 is a continuous and uninterrupted data stream that includes the necessary curative data sequences or operations 110 to allow decoder 30 to stream the video data stream without crashing or freezing.

Once the incoming video data stream 110 passes through video conditioner 24, the conditioned continuous uninterrupted video data stream 112 proceeds to router 26 wherein router 26 routes the continuous uninterrupted video data stream to computer network 28 and out to the end users wherein decoder 30 of each end user can continuously stream the video on display 32.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

I claim:

1. A method for conditioning a network based encoded video data stream comprising:
receiving the encoded real-time video data stream;

detecting an interruption in the encoded video data stream in a video conditioner;

inserting an encoded curative data sequence into the encoded video data stream in substantially real-time in the video conditioner to repair the detected interruption, wherein said encoded curative data sequence comprises at least one of a replacement screen data packet that comprises a data sequence and operation necessary to result in the display of all or part of a blank screen, a transitioning curative data sequence comprising a data sequence or an operation that provides a decoder the instructions and data necessary to complete a readable instruction of an incomplete data packet of the encoded real-time video data stream, or a resuming data sequence comprising a data sequence or an operation that provides a decoder a necessary decoding sequence or operation to transition from one of said replacement screen data packet or a transitioning curative data to said received encoded real-time video data stream; and outputting an encoded uninterrupted substantially real-time data stream from the video conditioner.

2. The method of claim 1 wherein the interruption is a missing or corrupted data sequence or operation.

3. The method of claim 2 wherein the encoded curative data sequence is a pre-coded encoded curative data sequence or operation that replaces the detected missing or corrupted data in the encoded video stream.

4. The method of claim 1 wherein detecting an interruption in the encoded video stream comprises decoding and reading the encoded video data stream.

5. The method of claim 1 wherein the network based encoded video data stream has been transmitted at least in part over an RF data link.

6. The method of claim 1 wherein the encoded curative data sequence includes a data sequence or operation resulting in the display of a message to an end user when decoded.

7. The method of claim 1 further comprising the steps of detecting a first good data sequence in a resuming portion of the encoded video data stream that ends the interruption and replacing at least a portion of the first good data sequence with a resuming data sequence or operation that results in a decodable transition from the area of blank screen to the resuming portion of the video data stream.

8. The method of claim 1 wherein the encoded curative data sequence or operation includes video timestamp and sequence data that maintains the integrity of the encoded video data stream.

9. The method of claim 1 further comprising transmitting a live encoded real-time video data stream over an RF data link.

10. A system for transmitting a network based encoded video data stream at least in part over an radio frequency (RF) data link comprising:

a camera obtaining a live stream of video footage;

an encoder in electronic communication with the camera, the encoder compressing the live stream of video footage into an encoded video data stream;

an RF transmitter in electronic communication with the encoder wherein the RF transmitter transmits a radio wave containing the encoded video data stream;

one or more RF receivers in radio communication with the RF transmitter wherein the RF receiver receives the radio wave containing the encoded video data stream from the RF transmitter;

a video conditioner in electronic communication with the one or more RF receivers wherein the encoded video data stream passes through the video conditioner, and wherein the video conditioner detects an interruption in the encoded video data stream and inserts a pre-coded encoded curative data sequence or operation into the encoded video data stream in place of the interruption in the encoded video data stream in substantially real-time, and the video conditioner outputs an encoded uninterrupted substantially live real-time conditioned video data stream;

a router in electronic communication with the video conditioner, wherein the router receives the encoded uninterrupted substantially live real-time conditioned video data stream from the video conditioner;

a computer network in electronic communication with the router wherein the router routes the encoded uninterrupted substantially live real-time conditioned video data stream through the computer network to one or more end user; and one or more decoders in electronic communication with the computer network, the decoder configured to decode the encoded uninterrupted substantially live real-time conditioned video data stream such that the end user may view the live stream of video footage on a display in substantially real-time.

11. The system of claim 10 wherein the interruption is one or more bit of missing or corrupted data.

12. The system of claim 11 wherein the encoded curative data sequence or operation replaces the detected missing or corrupted data in the encoded video stream.

13. The system of claim 10 wherein the video conditioner further decodes and reads the encoded video data stream to detect the interruption.

14. The system of claim 10 wherein the encoded curative data sequence or operation includes a data sequence or operation resulting in the display of an area of replacement screen.

15. The system of claim 14 wherein the encoded curative data sequence further includes a data sequence or operation resulting in the display of a message to an end user when decoded.

16. The system of claim 10 wherein the encoded curative data sequence further includes a transition data sequence resulting in a transition from a last known decoded state of the encoded video data stream to a replacement screen wherein the transition is correctly carried out by said one or more decoder.

17. The system of claim 10 wherein the video conditioner detects a first good data sequence in a resuming portion of the encoded video data stream after the interruption and replaces at least a portion of the first good data sequence with a resuming data sequence or operation that results in a decodable transition from a replacement screen or portion thereof to the resuming portion of the video data stream.

18. The system of claim 10 wherein said pre-coded curative data sequence comprises at least one of a replacement screen data packet that comprises a data sequence and operation necessary to result in the display of all or part of a blank screen, a transitioning curative data sequence comprising a data sequence or an operation that provides a decoder the instructions and data necessary to complete a readable instruction of an incomplete data packet of the encoded real-time video data stream, or a resuming data sequence comprising a data sequence or an operation that provides a decoder a necessary decoding sequence or operation to transition from one of said replacement screen data packet or a transitioning curative data to said received encoded real-time video data stream.

19. A method for conditioning an interruption in a network based encoded video data stream transmitted at least in part over an RF data link comprising:

receiving the encoded real-time video data stream in a video conditioner from an RF transmitter;

decoding and reading the encoded real-time video data stream in the video conditioner;

detecting a first missing or corrupt data in the encoded real-time video data stream in the video conditioner;

inserting a pre-coded encoded transition curative data sequence or operation into the encoded real-time video data stream in the video conditioner to complete a data packet in which the first missing or corrupt data was detected, wherein the encoded transition curative data sequence or operation provides a transition from a last known decoded state of the encoded real-time video data stream to a curative state of the real-time encoded video stream;

detecting an intetmediate missing or corrupt data in the encoded real-time video data stream in the video conditioner after detecting the first missing or corrupt data;

inserting a pre-coded intermediate encoded curative data sequence or operation into the encoded video data stream in the video conditioner to replace the detected intermediate missing or corrupt data wherein the intermediate encoded curative data sequence or operation includes a data sequence resulting in the display of a replacement screen or portion thereof;

detecting a first good data sequence of the encoded real-time video data stream occurring after the first missing or corrupt data sequence or operation in the video conditioner; and inserting a resuming pre-coded curative data sequence or operation into the encoded real-time video data stream in the video conditioner to transition from the intetmediate encoded curative data sequence to the detected first good data sequence wherein the resuming curative data sequence or operation includes a data sequence or operation that transitions from the replacement screen or portion thereof to the detected first good data sequence or operation;

outputting an encoded uninterrupted substantially real-time data stream from the video conditioner.

20. The method of claim 19 wherein the intermediate encoded curative data sequence or operation results in the display of a message to an end user.

21. The method of claim 19 wherein the encoded real-time video data stream is a live video stream.

* * * * *